Aug. 6, 1929.   J. R. ARMSTRONG   1,723,397
ADJUSTABLE TANGENT FOR METERS
Filed Feb. 23, 1924
Fig. 1
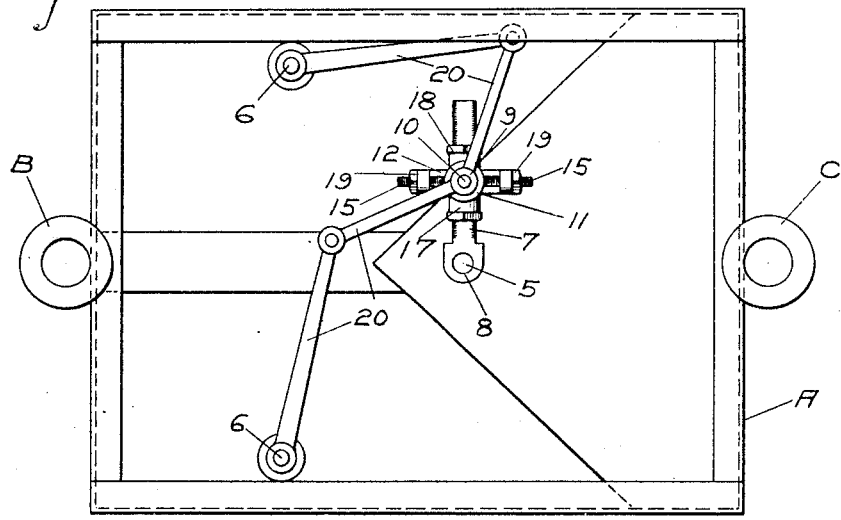
Fig. 2
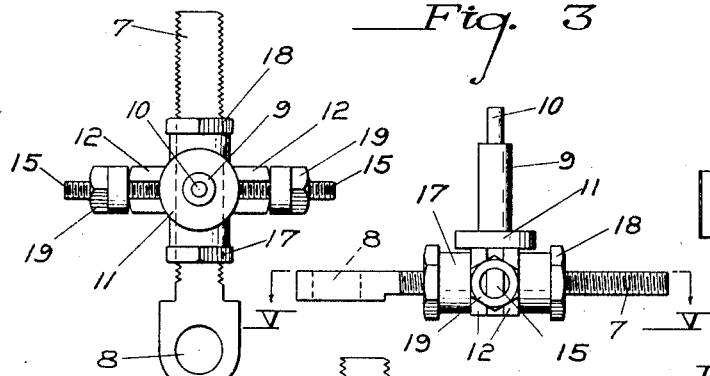
Fig. 4
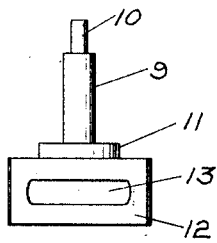
Fig. 3
Fig. 5
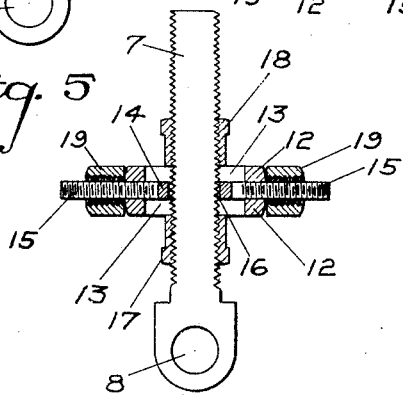
Fig. 6
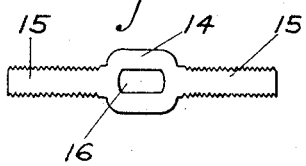
INVENTOR
James R. Armstrong
by W. J. Doolittle
his attorney Patented Aug. 6, 1929.

1,723,397

UNITED STATES PATENT OFFICE.

JAMES R. ARMSTRONG, OF INGRAM, PENNSYLVANIA, ASSIGNOR, BY MESNE ASSIGNMENTS, TO PITTSBURGH EQUITABLE METER COMPANY, A CORPORATION OF PENNSYLVANIA.

ADJUSTABLE TANGENT FOR METERS.

Application filed February 23, 1924. Serial No. 694,466.

This invention is for an adjustable tangent for meters, particularly gas meters, and has for its object to provide a tangent of relatively simple and cheap construction having a post which may be adjusted longitudinally and transversely of the crank arm.

The invention may be readily understood by reference to the accompanying drawings, in which:

Fig. 1 represents a horizontal section through the upper part of a meter, showing my invention applied thereto;

Fig. 2 is a top plan view of the adjustable tangent post assembly;

Fig. 3 is a side view thereof;

Fig. 4 is a front view of the post apart from the other elements of the assembly;

Fig. 5 is a horizontal section in the plane of line V—V of Fig. 3; and

Fig. 6 is a detail view of one of the adjustable elements.

In the drawings, A designates the outline of a standard or a suitable meter, having an inlet B and an outlet C. The revolving crank shaft is designated 5 and 6—6 designates the two flag-rods. Secured to the upper end of the crank shaft 5 is the tangent arm 7 having a hole 8 therein through which the top of the crank shaft passes. The arm, which is flat on its upper and lower sides, is threaded throughout substantially its entire length.

The tangent post is designated by the numeral 9 and has a reduced upper end 10 and an enlarged circular base part 11, on the under side of which are two parallel guide members 12 which may be formed integral with the post, and in which are slots 13.

Received and tightly fitted between the guides 12, is an adjusting bar having its two opposite faces flat, and having an enlarged central part 14 with transverse extensions 15 which are threaded throughout their length. This member has a slot 16 therein of just sufficient size to receive the threaded tangent arm, this slot being considerably shorter than slots 13 with which it registers.

On the tangent arm, which arm projects through slots 13 in the transverse guide member 12 and through slot 16 in the adjusting bar between the guides, is an inner adjusting nut 17 and an outer nut 18. It will be seen that, by letting up on one nut and taking up on the other, the post 9 may be adjusted toward or away from the center of rotation.

On each of the transverse extensions 15 of the adjusting bar 14 is a nut 19. By loosening one nut 19 and taking up on the other, the post, which slides on the adjusting bar by reason of guides 12, may be adjusted transversely one way or the other, the limit of adjustment being confined by the length of slots 13.

Nuts 17 and 18 and also nuts 19 are in the form of a threaded cylindrical sleeve having a non-circular head at the end thereof remote from the part of the post assembly with which they cooperate, so as to give clearance for the wrench. The jointed links which connect the tangent post with the respective flag-rods are designated 20.

From the foregoing, it can readily be seen that the post may be shifted transversely to the crank or longitudinally thereof, and held in such adjusted position, and that very accurate and fine increments of adjustment may be made.

I claim as my invention:

1. An adjustable tangent for meters comprising an arm, a transverse bar slidable along the arm, a tangent post having an extension supported on the transverse bar and slidable therealong transversely to the arm, means on the arm for adjustably holding the bar in position, and means on the bar for adjustably holding the post in position.

2. An adjustable tagent for meters comprising a threaded arm, a transverse bar on said arm through which the arm is slidably passed, a post having guide members at the base thereof, said guide members slidably engaging the transverse bar and having slots therein through which the arm passes, nuts threaded on the arm for effecting the adjustment of the bar therealong, and means on the bar for effecting the adjustment of the post along the bar and transversely of the arm.

3. An adjustable tangent for meters comprising a threaded arm of non-circular cross section, a bar having a non-circular opening therein through which the arm is slidably passed, whereby the bar is held against rotation, said bar having threaded non-circular extensions thereon extending transversely of the arm, a post provided with spaced apart guide members at the base thereof for slidably receiving the non-circular extensions of the bar, said guide members being provided with elongated slots through which the threaded arm extends, nuts on the threaded arm for engaging the outer sides of the guide members for adjustably holding the bar in position, and nuts on the threaded extensions of the bar for engaging the ends of the guide members for adjustably holding the post in position.

4. An adjustable tangent for meters comprising a threaded arm, a bar slidably mounted on said arm and provided with oppositely extending threaded extensions transverse to said arm, a tangent post provided with depending guide portions slidably receiving said threaded extensions, nuts engaging said threaded extensions to position said bar and arm with respect to said post and other nuts engaging said threaded arm to position said arm with respect to said guide portion.

In testimony whereof I affix my signature.

JAMES R. ARMSTRONG.